United States Patent
Phipps et al.

(10) Patent No.: US 10,312,797 B1
(45) Date of Patent: Jun. 4, 2019

(54) ZERO POWER STARTUP CIRCUIT FOR VIBRATIONAL ENERGY HARVESTING

(71) Applicant: SPAWAR Systems Center Pacific, San Diego, CA (US)

(72) Inventors: Alex G. Phipps, San Diego, CA (US); Eric G. Bozeman, La Mesa, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 315 days.

(21) Appl. No.: 15/250,299

(22) Filed: Aug. 29, 2016

(51) Int. Cl.
  *H02J 7/00* (2006.01)
  *H02M 1/36* (2007.01)
  *H02M 3/158* (2006.01)

(52) U.S. Cl.
  CPC ............ *H02M 1/36* (2013.01); *H02J 7/0052* (2013.01); *H02M 3/158* (2013.01); *H02J 2007/0059* (2013.01)

(58) Field of Classification Search
  CPC .......... H02M 1/36; H02J 7/0072; Y02B 70/16
  See application file for complete search history.

(56) References Cited

U.S. PATENT DOCUMENTS

| | | | |
|---|---|---|---|
| 3,980,965 A * | 9/1976 | Cunningham | H03G 5/10 330/302 |
| 7,105,982 B1 * | 9/2006 | Hagood, IV | H02N 2/181 310/319 |
| 7,928,634 B2 | 4/2011 | Fang | |
| 8,552,597 B2 | 10/2013 | Song et al. | |
| 2011/0051641 A1 * | 3/2011 | Pan | H04Q 9/00 370/311 |
| 2014/0239917 A1 * | 8/2014 | Bottarel | H02J 7/32 320/139 |

\* cited by examiner

*Primary Examiner* — Rexford N Barnie
*Assistant Examiner* — Elim Ortiz
(74) *Attorney, Agent, or Firm* — SPAWAR Systems Center Pacific; Kyle Eppele

(57) ABSTRACT

An energy harvesting system includes a transducer, a capacitor, a power converter, a power converter control line, a control switch and a control switch control line. The transducer harvests energy and outputs electrical current based on the harvested energy. The capacitor stores a rectified voltage based on the electrical current. The control switch can be open or closed. The control switch control line is arranged to provide a control voltage based on the rectified voltage to the control switch. When the control voltage is equal to or greater than a threshold voltage the control switch is closed such that the power converter control line electrically connects the power converter to a battery in order to provide harvested energy to the battery.

18 Claims, 6 Drawing Sheets

ZERO POWER STARTUP CIRCUIT FOR VIBRATIONAL ENERGY HARVESTING

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 102,790.

BACKGROUND OF THE INVENTION

Embodiments of the invention relate to energy harvesting systems.

For wireless and distributed sensor systems, vibrational energy harvesting provides a way to extend the operational lifetime beyond what a chemical battery alone can provide. By converting mechanical vibrations (e.g., from a pump, vehicle, structural frame, etc.) into electrical energy, vibrational energy harvesting can be used to either supplement or replace chemical batteries.

BRIEF SUMMARY OF THE INVENTION

An aspect of the present invention is drawn to an energy harvesting system including a transducer, a capacitor, a power converter, a power converter control line, a control switch and a control switch control line. The transducer harvests energy and outputs electrical current based on the harvested energy. The capacitor stores as voltage, $V_{Rect}$, based on the electrical current. The control switch can be open or closed. The control switch control line is arranged to provide a control voltage, $V_C$, based on $V_{Rect}$, to the control switch. When $V_C$ is less than a threshold voltage, $V_{th}$, the control switch is open such that the power converter control line is electrically disconnected from the power converter and such that the power converter is inactive. When $V_C \geq V_{th}$, the control switch is closed such that the power converter control line electrically connects with the power converter, such that the power converter receives an operating signal from a battery and such that the power converter outputs converted energy, based on $V_C$, to the battery.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE INVENTION

A conventional energy harvesting system will now be described in greater detail with reference to FIGS. 1-3.

Figure 1:
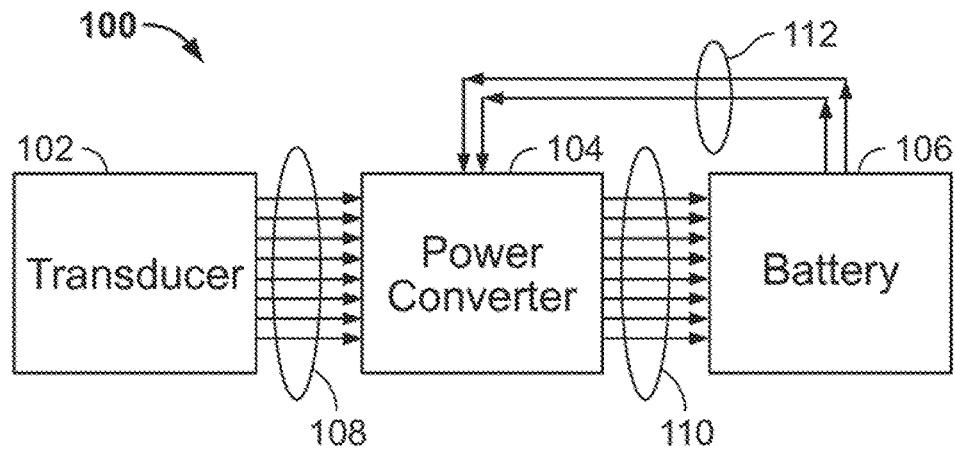
FIG. 1 illustrates a conventional energy harvesting system.

FIG. 1 illustrates conventional energy harvesting system 100.

As illustrated in the figure, energy harvesting system 100 includes a transducer 102, a power converter 104 and a battery 106.

Transducer 102 is arranged to provide the electrical energy 108 to power converter 104. Power converter 104 is further arranged to provide the converted energy 110 to battery 106. Battery 106 is further arranged to provide the overhead power 112 to power converter 104.

Transducer 102 may be any system or device able to convert one form of energy to electrical energy. Non-limiting examples may be any one of an optoelectronic transducer, a piezoelectric transducer, an optoelectronic transducer, a magnetoelectric transducer, a bioelectric transducer, a thermoelectric transducer and combinations thereof. Power converter 104 may be any system or device that is able to convert electrical energy 108 provided by transducer 102 to converted energy 110 that is acceptable to battery 106. Battery 106 may be any system or device able to store energy and provide overhead power 112 in order to enable operation of power converter 104.

In operation, transducer 102 converts applied energy to electrical energy 108. Applied energy may be in any suitable form such as, but not limited to, mechanical, solar, thermal or acoustic. Power converter 104 accepts electrical energy 108 and converts it to converted energy 110, which is in a form acceptable to battery 106. Typically, converted energy 110 is slightly less than electrical energy 108 due to a certain amount of inefficiency in power converter 104.

Power converter 104 is comprised of active circuit elements (transistors) that require a certain amount of overhead power 112 to operate. Overhead power 112 is provided by battery 106 as it is being recharged by converted energy 110. In this embodiment, since overhead power 112 required to operate power converter 104 is smaller than converted energy 110, there is a net positive amount of energy flowing to battery 106 (more energy will flow into the battery than out of it).

The operation of energy harvesting system 100 with the application of a decreased amount of applied energy to the system will now be described with further reference to FIG. 2.

Figure 2:
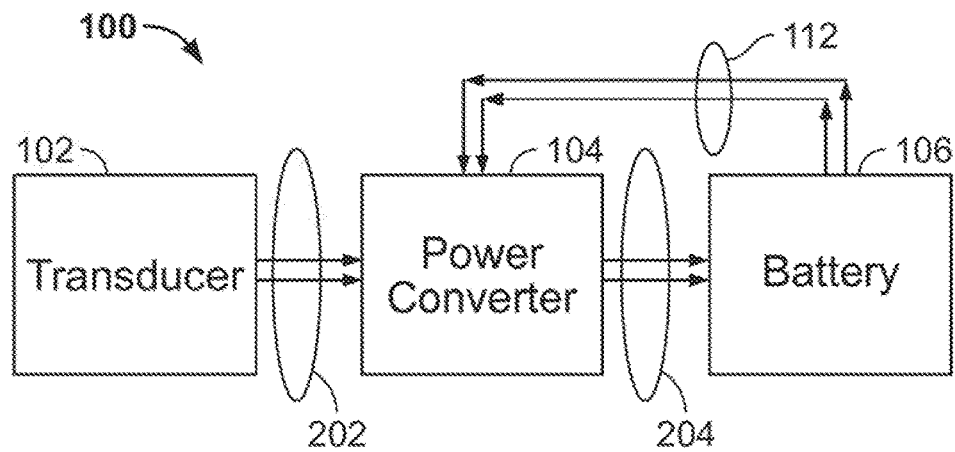
FIG. 2 illustrates the conventional energy harvesting system of FIG. 1, as it harvests a smaller amount of energy than described above with reference to FIG. 1.

FIG. 2 illustrates conventional energy harvesting system 100 as it harvests a smaller amount of energy than described above with reference to FIG. 1.

Transducer 102 is arranged to provide the electrical energy 202 to power converter 104. Power converter 104 is further arranged to provide the converted energy 204 to battery 106. Battery 106 is further arranged to provide overhead power 112 to power converter 104.

In operation, as discussed above with reference to FIG. 1, transducer 102 converts applied energy to electrical energy 202; power converter 104 accepts electrical energy 202 and converts it to converted energy 204, which is in a form acceptable to battery 106. In this example, converted energy 204 is just sufficient to meet overhead power 112 requirements of power converter 104.

The operation of energy harvesting system 100 with insufficient harvested energy to meet the overhead power requirements of the system will be described with further reference to FIG. 3.

Figure 3:
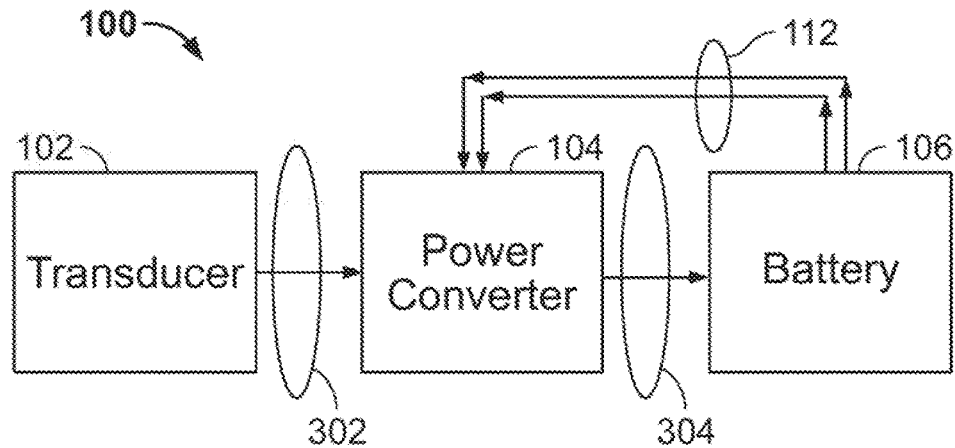
FIG. 3 illustrates the conventional energy harvesting system of FIG. 1, as it harvests insufficient energy to meet system overhead power requirements.

FIG. 3 illustrates conventional energy harvesting system 100 as it harvests insufficient energy to meet the overhead power requirements of the system.

Transducer 102 is arranged to provide the electrical energy 302 to power converter 104. Power converter 104 is further arranged to provide the converted energy 304 to battery 106. Battery 106 is further arranged to provide overhead power 112 to power converter 104.

In operation, converted energy 304 delivered to battery 106 is insufficient to meet overhead power 112 requirements of power converter 104. In this situation, more energy flows out of the battery than into it, draining battery 106.

An improved circuit and method for harvesting energy that will prevent unwanted battery drain is needed.

Aspects of the present invention provide a circuit and method for harvesting energy without unwanted battery drain.

In accordance with aspects of the present invention, the purpose of the invention is to conserve power in an energy harvesting system by only turning on the power electronics, which can potentially be power hungry, when applied energy is present to be harvested. In order for energy harvesting systems to be efficient, a power converter circuit is typically required to efficiently deliver the harvested energy from the transducer (the device that converts one form of energy to electrical energy) to the storage element (battery). The power converter is comprised of active circuit elements (transistors) and therefore requires a certain amount of overhead power to operate. This overhead power typically comes from the battery being recharged. While the power consumption of the power converter is relatively small, it can be detrimental to the system if insufficient energy is harvested to replace it. For systems where the applied energy source is not constantly available or only present for irregular intervals, the consumption of the power converter will dominate and more energy will flow out of the battery than into it.

A zero power startup switch (ZPSS) is introduced into the energy harvesting system in order to gate the power converter from the battery when the energy harvested is insufficient to compensate for the power converter overhead power requirements. This circuit measures the output from the transducer, determines if enough energy is present to merit the operation of the power converter, and either connects or disconnects the power converter from the battery as appropriate, preventing unwanted battery drain.

Aspects of the present invention will now be further described with reference to FIGS. 4-10.

The operation of energy harvesting system 400 with the application of insufficient energy to meet the power overhead requirements of the power converter will now be described in detail with reference to FIG. 4A.

Figure 4A:
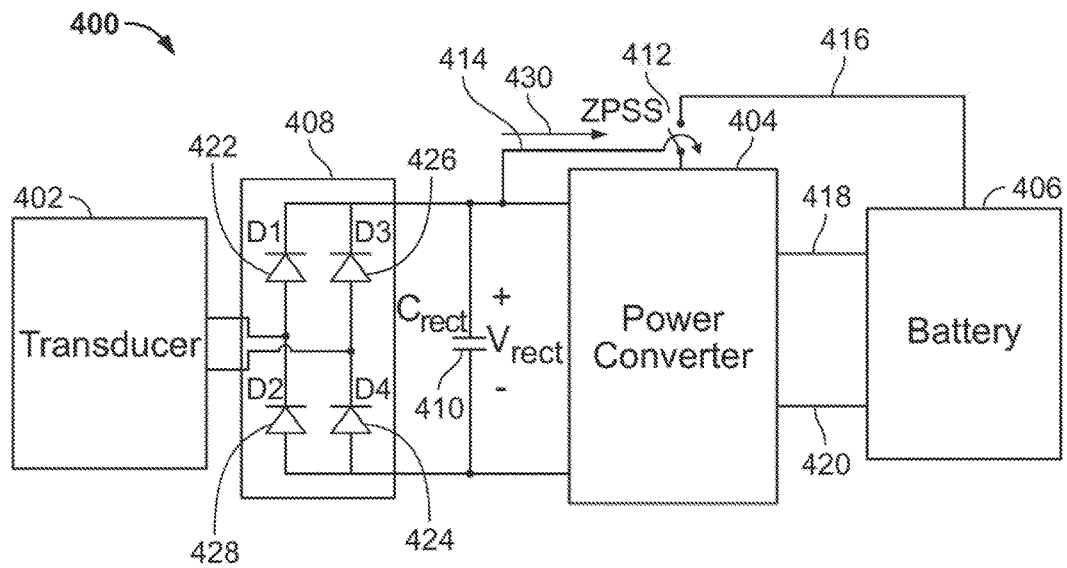
FIG. 4A illustrates an example energy harvesting system, in accordance with aspects of the present invention, as it harvests insufficient energy to meet the overhead power requirements of the system.

FIG. 4A illustrates an example energy harvesting system 400 as it harvests insufficient energy to meet the overhead power requirements of the system in accordance with aspects of the present invention.

As illustrated in the figure, energy harvesting system 400 includes a transducer 402, a rectifier 408, a capacitor 410, a power converter 404, a battery 406, and a control switch 412. Further, rectifier 408 includes a diode 422, a diode 424, a diode 426 and a diode 428.

Transducer 402 is arranged to provide an AC voltage across rectifier 408, which is arranged in parallel with capacitor 410. Rectifier 408 is arranged as a bridge inverter so that diodes 422, 424, 426 and 428 conduct in pairs according to the AC voltage polarity to produce a rectified DC voltage across capacitor 410 during the entire AC voltage sine wave. Capacitor 410 is arranged to provide rectified DC voltage, $V_{rect}$, to power converter 404 and a control voltage, $V_C$, 430 (rectified DC voltage at this particular time) through a control switch control line 414 to control operation of control switch 412. At this time, control switch 412 is further arranged to be in an open state based on $V_C$ 430, disconnecting a power converter control line 416 from battery 406. Battery 406 is arranged to receive converted power from power converter 404 through a power line 418 and return power line 420 if control switch 412 is closed. Further, power converter 404 is arranged to receive overhead power through power converter control line 416 if control switch 412 is closed.

Transducer 402 may be any system or device able to convert one form of energy to electrical energy. Non-limiting examples may be any one of a piezoelectric transducer, an optoelectronic transducer, a magnetoelectric transducer, a bioelectric transducer, a thermoelectric transducer and combinations thereof. Capacitor 410 may be any system or device capable of storing charge in a circuit. Power converter 404 may be any system or device able to convert rectified DC voltage from capacitor 410 to energy that is acceptable by battery 406. Battery 406 may be any system or device able to store energy and provide an output signal to control or enable power converter 404. Control switch 412 may be any system or device able to switch from an open state to a closed state based upon $V_C$ 430 in order to electrically connect/disconnect battery 406 and power converter 404 through power converter control line 416.

Control switch 412 may be realized using a variety of electronic components. Non-limiting example embodiments include the use of a MOSFET (metal oxide semiconductor field effect transistor) with the gate tied to rectified DC voltage from rectifier 408 and the source/drain connected between battery 406 and power converter 404, an electromechanical relay with the low-power terminals connected between the rectified DC voltage from rectifier 408 and Ground (GND) or a BJT (bipolar junction transistor).

Rectifier 408 is provided as an example embodiment. Other combinations or arrangements of transducer and power converter may not require a rectifier. For the purposes of this discussion, in this embodiment, transducer 402 outputs an AC voltage and the power converter 404 requires a DC voltage, therefore rectifier 408 is needed. In this example embodiment, rectifier 408 is a full wave rectifier in order to provide a rectified DC voltage during the entire cycle of the AC voltage sine wave. In other example embodiments, a half wave rectifier may be implemented.

Figure 5:
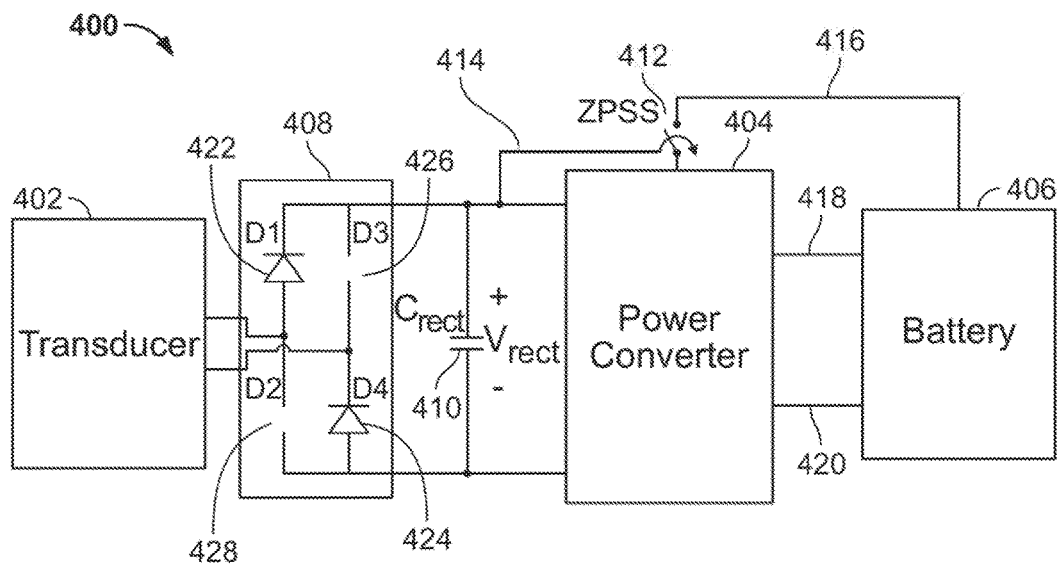
FIG. 5 illustrates the example energy harvesting system of FIG. 4A, during the positive portion of the transducer output AC voltage sine wave.
Figure 6:
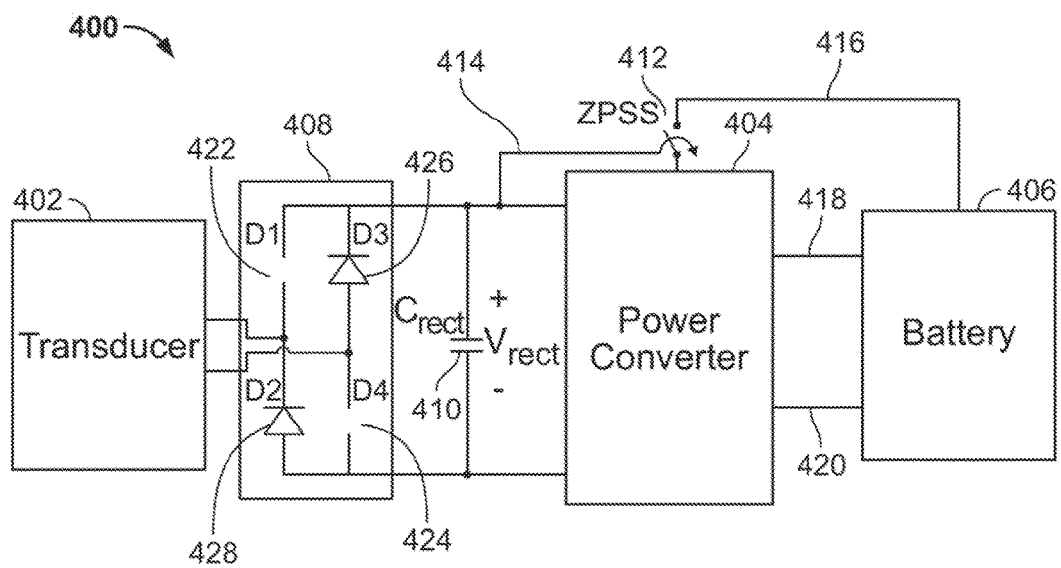
FIG. 6 illustrates the example energy harvesting system of FIG. 4A, during the negative portion of the transducer output AC voltage sine wave in accordance with aspects of the present invention.

The operation of rectifier 408 will be further described with additional reference to FIGS. 5-6.

FIG. 5 illustrates example energy harvesting system 400 during the positive portion of the transducer output AC voltage sine wave in accordance with aspects of the present invention.

Rectifier 408 is arranged so that diode 422 and diode 424 conduct and produce a rectified DC voltage, $V_{rect}$, across capacitor 410.

In operation, when transducer 402 is producing a positive voltage output to rectifier 408. Diode 422 and diode 424 both conduct and produce $V_{rect}$ across capacitor 410.

FIG. 6 illustrates example energy harvesting system 400 during the negative portion of the transducer output AC voltage sine wave in accordance with aspects of the present invention.

Rectifier 408 is arranged so that diode 426 and diode 428 conduct and produce $V_{rect}$ across capacitor 410.

In operation, when transducer 402 is producing a negative voltage output to rectifier 408. Diode 426 and diode 428 both conduct and produce $V_{rect}$ across capacitor 410.

Returning to FIG. 4A, rectifier 408 is a full wave rectifier, producing a rectified DC voltage over the entire cycle of the AC voltage sine wave produced by transducer 402.

As illustrated in the figure, control switch 412 measures $V_{rect}$ across capacitor 410, $V_C$ 430, on control switch control line 414 and may change state depending on this measured voltage. For example, if $V_C$ 430 is equal to or greater than a threshold voltage, $V_{th}$, at which the overhead power requirement of power converter 404 is met by battery 406, control switch 412 will close.

As illustrated in the figure, control switch 412 has sensed the magnitude of $V_C$ 430, determined that $V_C$ 430 is less than $V_{th}$, and opened control switch 412 (or control switch 412 remains open depending on its prior state). As a result, battery 406 is disconnected from power converter 404 (or they remain disconnected) and no converted energy will flow to battery 406 from power converter 404. At this point in time, there is no path for energy to flow except to capacitor 410; therefore, $V_{rect}$ across capacitor 410 continues to increase as long as control switch 412 remains open. As the rectified DC voltage at capacitor 410 continues to increase, control switch 412 will remain in an open state as long as $V_C$ 430 remains below $V_{th}$.

The operation of energy harvesting system 400 with the application of sufficient energy to meet the overhead power requirements of the system will now be further described with reference to FIG. 4B.

Figure 4B:
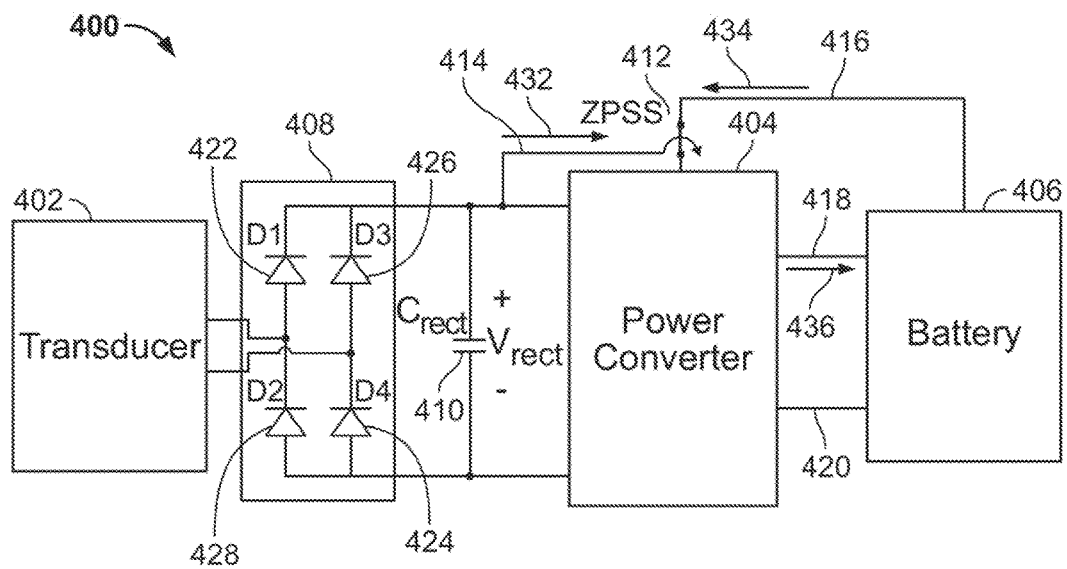
FIG. 4B illustrates the example energy harvesting system of FIG. 4A, as it harvests sufficient energy to meet the power overhead requirements of the system.

FIG. 4B illustrates example energy harvesting system 400 at a point in time as it harvests energy to meet the overhead power requirements of the system in accordance with aspects of the present invention.

As illustrated in the figure, control switch 412 is arranged to receive a $V_C$ 432 (rectified DC voltage at this particular time). Since control switch 412 is closed, power converter 404 is arranged to receive an operating signal 434 from battery 406. Further, battery 406 is arranged to receive converted energy 436 from power converter 404.

In operation, control switch 412 senses $V_C$ 432 on control switch control line 414 and determines that $V_C$ 432 is greater than or equal to $V_{th}$. As a result, control switch 412 is closed (or remains closed depending on the prior state). Power converter 404 is now connected (or remains connected) to battery 406 and battery 406 receives converted power 436 from power converter 404 through power line 418. Operating signal 434 is sent through line 416 from battery 406 to power converter 404 in order to provide power converter 404 with the necessary operating overhead power.

If the applied energy to transducer 402 is removed from the system while control switch 412 is closed and power converter 404 is delivering power to battery 406, power converter 404 will remain on and continue to transfer energy from capacitor 410 to battery 406. Eventually, $V_{rect}$ across capacitor 410 will decrease until it eventually falls below $V_{th}$ and control switch 412 will open.

Figure 7:
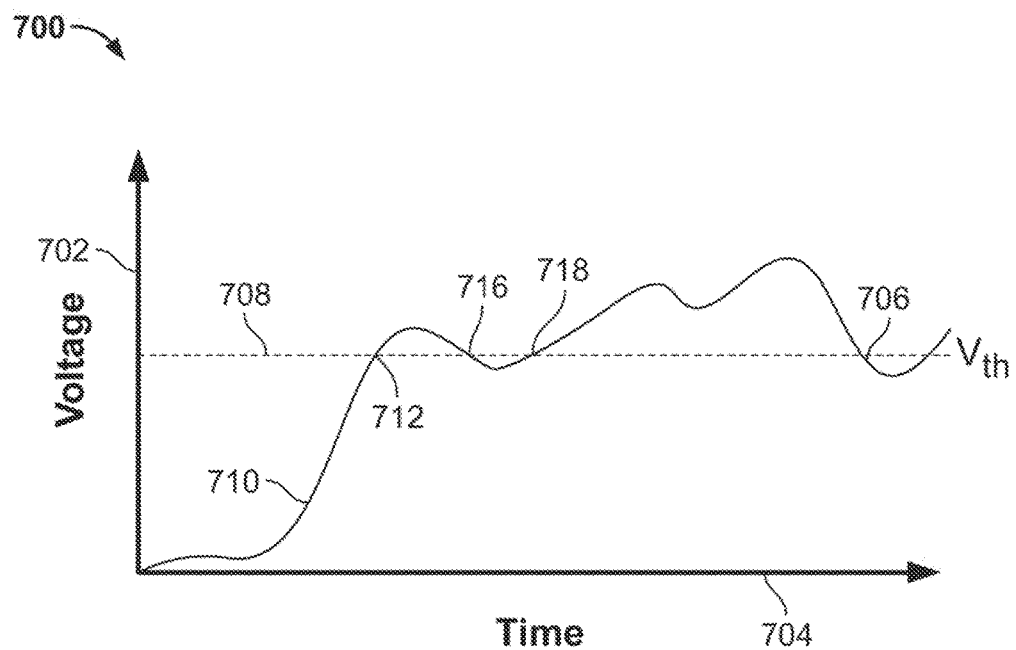
FIG. 7 illustrates a graph of control voltage as a function of time of the example energy harvesting system of FIG. 4A.

The effect on the energy harvesting system 400 of control voltage as a function of time is discussed with further reference to FIG. 7.

FIG. 7 illustrates a graph 700 of control voltage as a function of time with additional reference to FIGS. 4A-4B.

As illustrated in the figure, graph 700 includes a control voltage y-axis 702, a time x-axis 704 and a dotted line 708 representing $V_{th}$.

Referring to FIG. 4A, at time=0, no voltage is present across capacitor 410 because no applied energy is present. Once energy is applied to the transducer 402, $V_{rect}$ across capacitor 410, and $V_C$ 430, begins to increase.

Returning to FIG. 7, $V_C$ continues to increase as noted at point 710 on the curve that represents the voltage at differing points time. Referring to FIG. 4A, control switch 412 remains open until, the value of $V_C$ reaches $V_{th}$ as designated by point 712.

At the point in time identified as 712 in FIG. 7, and with reference to FIG. 4B, control switch 412 closes and converted energy 436 is transferred from power converter 404 to battery 406 via power converter control line 416, and battery 406 provides operating signal 434 to power converter 404.

Returning to FIG. 7, $V_C$ continues to rise until, at the point in time designated as 716, $V_C$ decreases to $V_{th}$ and then continues to decrease until it has fallen below $V_{th}$. Fluctuations in $V_C$ occur if energy applied to the system is removed or occurs irregularly.

Referring back to FIG. 4A, when $V_C$ 430 has fallen below $V_{th}$ control switch 412 opens, disconnecting the power converter 404 from the battery 406. However, should $V_{rect}$ across capacitor 410 rise again exceeding $V_{th}$ as represented by point in time 718 in FIG. 7 then, referring back to FIG. 4B, control switch 412 closes, connecting power converter 404 to battery 406 and providing power converter 404 with operating signal 434 from battery 406 via the power converter control line 416.

Returning to FIG. 7, $V_C$ remains above $V_{th}$ 718, although fluctuations occur due to applied energy irregularity (as discussed above). At 706, $V_C$ begins to decrease until it again drops below the $V_{th}$ and the power converter 404 is disconnected from battery 406.

Additional non-limiting example embodiments of an energy harvesting system in accordance with aspects of the present invention will now be described with additional reference to FIGS. 8-10.

Some embodiments may enable removable or replaceable power converters. Further, such replaced power converters may have different amounts of energy consumption for operation. As such, it might be needed to change $V_{th}$. The operation of energy harvesting system 400 with the introduction of a controller operable to vary the resistance across an impedance element will be discussed with further reference to FIG. 8.

Figure 8:
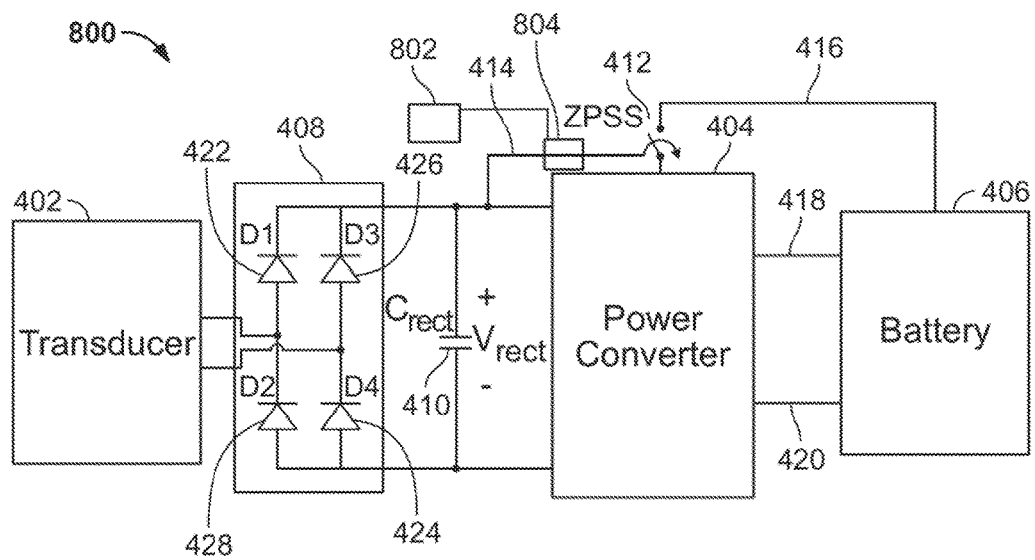
FIG. 8 illustrates another example embodiment of an energy harvesting system in accordance with aspects of the present invention.

FIG. 8 illustrates another example embodiment of an energy harvesting system 800 in accordance with aspects of the present invention.

As illustrated in the figure, energy harvesting system 800 includes all the elements of energy harvesting system 400 with the addition of a controller 802 and an impedance element 804.

Impedance element 804 is arranged to provide a variably-controlled impedance on control switch control line 414 and receive a control signal from controller 802.

Impedance element 804 may be any system or device that is operable to vary the amount of current that flows through a circuit in response to either a mechanical or electronic action. Non-limiting examples of impedance element 804 include a variable resistor, a variable capacitor, a variable inductor and combinations thereof.

Controller 802 may be any system or device that provides a mechanical or electronic action or signal to vary the resistance of impedance element 804. Non-limiting example embodiments of controller 802 may include any of a system or device to mechanically adjust a potentiometer, move a rheostat wiper or provide an electronic signal to a digital resistor.

In operation, impedance element 804 is included to provide impedance on control switch control line 414 in order to adjust the amount of energy measured by control switch 412. The resistance of impedance element 804 may be varied by controller 802. The effect of adjusting the resistance of impedance element 804 is to decrease/increase the energy sensed by switch 412, thus effectively changing the instantaneous value of $V_{th}$. In this manner, if power converter 404 is replaced with a different power converter that consumes a different amount of energy, the turning on/off of control switch 412 may be modified.

The operation of energy harvesting system 400 with the introduction of a controller operable to vary the capacitance across a variable capacitor will be discussed with further reference to FIG. 9.

Figure 9:
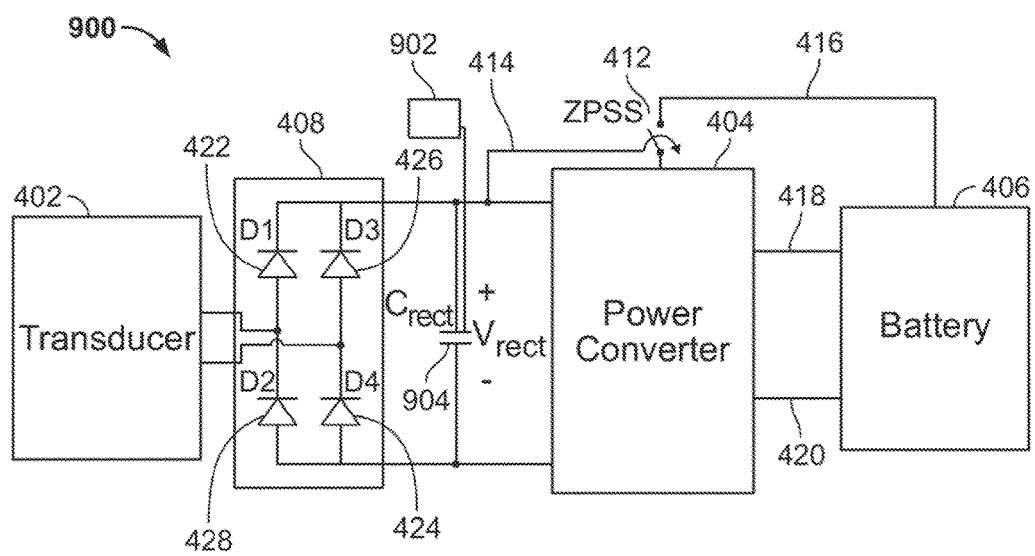
FIG. 9 illustrates another example embodiment of an energy harvesting system in accordance with aspects of the present invention.

FIG. 9 illustrates another example embodiment of an energy harvesting system 900 in accordance with aspects of the present invention.

As illustrated in the figure, energy harvesting system 900 includes all the elements of energy harvesting system 400 with the exception that variable capacitor 904 replaces capacitor 410 and the inclusion of a controller 902.

Variable capacitor 904 is arranged to receive rectified DC voltage from rectifier 408 and a control signal from controller 902.

Variable capacitor 904 may be any system or device that is operable to vary the amount of capacitance in a circuit in response to either a mechanical or electronic action. Non-limited example embodiments include any of a mechanically controlled capacitor, an electronically controlled capacitor or a digitally tuned capacitor. Controller 902 may be any system or device that is operable to vary the capacitance of variable capacitor 904 using electrical or mechanical system or device. Non-limiting example embodiments include a system or device that controls the distance between conducting plates, a system or device that controls the overlapping plate surface area or applying a DC voltage to electrically vary capacitance.

In operation, the capacitance of variable capacitor 904 may be varied by controller 902 in order to adjust the effective amount of energy sensed by switch 412. The effect of adjusting the capacitance of variable capacitor 904 is to decrease/increase the energy sensed by switch 412, thus effectively changing $V_{th}$.

The operation of energy harvesting system 400 with the introduction of a controller operable to vary both the capacitance across a variable capacitor and an impedance element will be discussed with further reference to FIG. 10.

Figure 10:
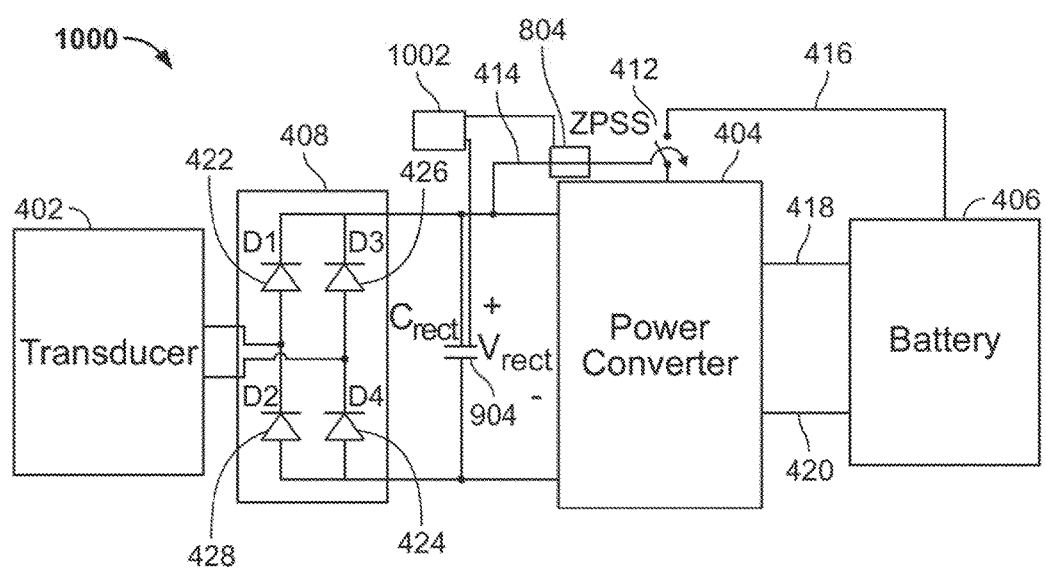
FIG. 10 illustrates another example embodiment of an energy harvesting system in accordance with aspects of the present invention.

FIG. 10 illustrates another example embodiment of an energy harvesting system 1000 in accordance with aspects of the present invention.

As illustrated in the figure, energy harvesting system 1000 includes all the elements of energy harvesting system 800 and energy harvesting system 900, with the exception that a controller 1002 replaces controller 802 (in FIG. 8) and controller 902 (in FIG. 9).

As shown in the figure, controller 1002 is arranged to provide control signals to both impedance element 804 and variable capacitor 904.

Controller 1002 may be any system or device that is operable to provide the function of controller 902, as discussed above with reference to FIG. 9 and the function of controller 802, as discussed above with reference to FIG. 8.

In operation, controller 1002 may vary the resistance of impedance element 804 and the capacitance of variable capacitor 904 in order to effectively change the instantaneous value of $V_{th}$, as discussed above with reference to FIGS. 8-9.

In summary, for an energy harvesting system to be efficient, a power converter circuit is typically required to efficiently deliver the harvested energy from the transducer (the device that converts the energy of one form into electrical energy) to the storage element (battery). Typically, the overhead power of the power converter circuit comes from the battery being recharged. Practical prior art energy harvesting systems rely on this overhead power being small compared to the harvested energy, resulting in a net positive amount of energy flowing into the battery. While the power consumption of the converter is relatively small, it can be detrimental to the system if insufficient energy is harvested to replace it. For systems where the applied energy source is not constantly available or only present for irregular intervals, the consumption of the power converter may dominate, and the net power into the battery will be negative (more energy will flow out of the battery than into it).

Aspects of the present invention include a zero power startup switch (ZPSS) to gate the power converter from the battery when the energy harvested is insufficient to compensate for the power converter overhead. The ZPSS is a circuit which measures the output from the transducer, determines if enough energy is present to merit the operation of the power converter, and either connects or disconnects the power converter from the battery as appropriate. By including the ZPSS in the circuit, it is possible to increase the overall efficiency of the energy harvesting system. The invention provides an ultra-low power method of determining whether applied energy is present in the system and whether or not the power converter circuitry should be turned on/off. By keeping the power converter on only when needed, wasted energy can be minimized.

The inclusion of the ZPSS in the energy harvesting system minimizes wasted energy and provides a system or device to extend operational lifetime beyond what a chemical battery alone can provide and be used to either extend the lifetime of or replace chemical batteries in, for example, wireless and distributed sensor systems. This invention could be used as a system or device to actuate other circuits; it is not restricted to energy harvesting. An alternative to integrating the ZPSS directly into the energy harvesting system would be to use a separate battery or energy harvester to generate the power needed to run an active applied energy detection system.

This would require an external power source, however, and would ultimately increase the size of the system.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. An energy harvesting system for preventing unwanted battery drain, said energy harvesting system comprising:
    a transducer;
    a capacitor;
    a power converter;
    a power converter control line;
    a control switch, the control switch comprising one of: a metal oxide semiconductor field effect transistor having a gate tied to rectified DC voltage from a rectifier and a source/drain, the source/drain configured to couple with a battery and the power converter; and an electromechanical relay having a terminal tied to the rectified DC voltage from the rectifier and another terminal coupled with one of ground and a bipolar junction transistor; and
    a control switch control line,
    wherein said control switch control line is arranged to provide a control voltage, based on a rectified voltage, to said control switch,
    wherein, when the control voltage is less than a predetermined threshold voltage, said control switch is operable in an open state,
    wherein said power converter control line decouples from said power converter, and
    wherein said power converter deactivates.

2. The system of claim 1, further comprising a rectifier disposed between said transducer and said capacitor.

3. The system of claim 2, wherein said transducer comprises at least one of a group consisting essentially of a piezoelectric transducer, an optoelectronic transducer, a magnetoelectric transducer, a bioelectric transducer, and a thermoelectric transducer.

4. The system of claim 3,
    wherein said transducer comprises a piezoelectric transducer, and
    wherein said rectifier comprises a full wave rectifier.

5. The system of claim 1, further comprising an impedance element disposed on said control switch control line.

6. The system of claim 5, further comprising an impedance control device coupled with at least one of a group consisting essentially of said capacitor and said impedance element.

7. The system of claim 6,
    wherein said impedance element comprises an adjustable resistor, and
    wherein said impedance control device is coupled with said adjustable resistor and is operable for adjusting resistance of said adjustable resistor to adjust the threshold voltage.

8. The system of claim 6,
    wherein said capacitor comprises an adjustable capacitor, and
    wherein said impedance control device is coupled with said adjustable capacitor and is operable for adjusting capacitance of said adjustable capacitor to adjust the threshold voltage.

9. The system of claim 6,
    wherein said impedance element comprises an adjustable resistor,
    wherein said capacitor comprises an adjustable capacitor, and
    wherein said impedance control device is coupled with said adjustable resistor, is coupled with said adjustable capacitor, is operable for adjusting resistance of said adjustable resistor, and is operable for adjusting capacitance of said adjustable capacitor to adjust the threshold voltage.

10. An energy harvesting system for preventing unwanted battery drain, comprising:
    a transducer operable to harvest energy and to output an electrical current based on the harvested energy;
    a capacitor operable to store a rectified voltage based on the electrical current provided by the transducer;
    a power converter;
    a power converter control line;
    a control switch operable to be in one of an open state and a closed state, the control switch comprising one of: a metal oxide semiconductor field effect transistor having a gate tied to rectified DC voltage from a rectifier and a source/drain, the source/drain configured to couple with a battery and the power converter; and an electromechanical relay having a terminal tied to the rectified DC voltage from the rectifier and another terminal coupled with one of ground and a bipolar junction transistor;
    a battery; and
    a control switch control line,
    wherein said control switch control line is arranged to provide a control voltage, based on the rectified voltage, to said control switch,
    wherein, when the control voltage is less than a threshold voltage, said control switch is in an open state, and
    wherein said power converter control line decouples from said power converter.

11. The system of claim 10, further comprising a rectifier disposed between said transducer and said capacitor.

12. The system of claim 11, wherein said transducer comprises at least one of a group consisting essentially of a piezoelectric transducer, an optoelectronic transducer, a magnetoelectric transducer, a bioelectric transducer, and a thermoelectric transducer.

13. The system of claim 12,
    wherein said transducer comprises a piezoelectric transducer, and
    wherein said rectifier comprises a full wave rectifier.

14. The system of claim 10, further comprising an impedance element disposed on said control switch control line.

15. The system of claim 14, further comprising an impedance control device in connection with at least one of a group consisting essentially of said capacitor and said impedance element.

16. The system of claim 15,
    wherein said impedance element comprises an adjustable resistor, and wherein said impedance control device is coupled with said adjustable resistor and is operable for adjusting resistance of said adjustable resistor to adjust the threshold voltage.

17. The system of claim 15, wherein said capacitor comprises an adjustable capacitor, and wherein said impedance control device is coupled with said adjustable capacitor and is operable for adjusting capacitance of said adjustable capacitor to adjust the threshold voltage.

18. A method of using an energy harvesting system for preventing unwanted battery drain, the system comprising a transducer, a capacitor, a power converter, a power converter control line, a control switch operable in one of an open state and a closed state, a battery, and a control switch control line, said method comprising:

harvesting, via the transducer, energy, thereby providing harvested energy;

outputting, via the transducer, electrical current based on the harvested energy;

storing, via the capacitor, a rectified voltage based on the electrical current;

providing, via the control switch control line, a control voltage, based on the rectified voltage, to said control switch, providing the control switch comprising providing one of: a metal oxide semiconductor field effect transistor having a gate tied to rectified DC voltage from a rectifier and a source/drain, the source/drain configured to couple with a battery and the power converter; and an electromechanical relay having a terminal tied to the rectified DC voltage from the rectifier and another terminal coupled with one of ground and a bipolar junction transistor;

when the control voltage is less than a predetermined threshold voltage, placing the control switch in an open state, wherein the power converter control line decouples from the power converter, and wherein the power converter deactivates; and when the control voltage is equal to or greater than then instantaneous threshold voltage, placing the control switch in a closed state, wherein the power converter control line couples with the power converter, wherein the power converter receives an operating signal from the battery, and wherein the power converter outputs converted energy, based on the control voltage, to the battery.

* * * * *